March 11, 1969 T. WASSILL 3,431,982
SPRING TRIP RELEASE FOR A CHISEL PLOW

Filed May 11, 1966

United States Patent Office 3,431,982
Patented Mar. 11, 1969

3,431,982
SPRING TRIP RELEASE FOR A CHISEL PLOW
Terry Wassill, Melville, Saskatchewan, Canada
Filed May 11, 1966, Ser. No. 549,420
Claims priority, application Canada, May 14, 1965,
930,676
U.S. Cl. 172—710                                 4 Claims
Int. Cl. A01b *15/00, 23/00, 31/00*

ABSTRACT OF THE DISCLOSURE

An assembly for resiliently, pivotally mounting the shank of an earth working tool to enable the same to yield, on encountering an obstruction. The shank is itself pivoted and its end bears against a bar member that is pivoted about a second parallel axis, a spring acting on the bar member to hold it and hence the shank in a normal operating condition.

---

The present invention relates to farm implements and particularly to improvements in chisel plows.

Chisel plows are well known and consist of a frame having shanks secured thereto at one end, with the other or free end projecting downwardly for penetration into the ground to be cultivated. The end secured to the frame can be rigidly secured but is usually resiliently mounted to permit deflection of the shank when the free end strikes a generally immovable object. These mountings in the past have permitted only certain deflection, and furthermore the mounting has been of such a nature that the compression spring carries the load in direct proportion to the load imposed upon the free end of the shank during cultivation. Also, in the known structures, the amount of deflection has been very limited and thus in many instances striking large objects causes damage to the shank.

It is an object of the present invention to provide an improved mounting whereby the shank may be secured to the frame of the implement.

It is a further object of the present invention to provide a mounting permitting relatively large deflection of the shank when the free end of the latter strikes a generally immovable object.

In accordance with the present invention there is provided a mounting assembly for securing a shank to the frame of an implement comprising a generally rigid first member securable to the frame of said implement; a rigid bar member pivotally secured to said first member at a first pivot axis and having a portion extending outwardly therefrom, means resiliently biasing said bar to a first operative position, and means for mounting said shank to said first rigid member to pivot about a second axis disposed at a position remote from said first axis and extension means rigid with respect to said shank projecting from said second axis of pivot toward said first axis and engaging said extending portion of the bar at a position to act against the resilient bias and thereby resiliently bias the shank to a normally operative position.

The invention is illustrated by way of example in the accompanying drawings wherein.

Figures 1, 2:
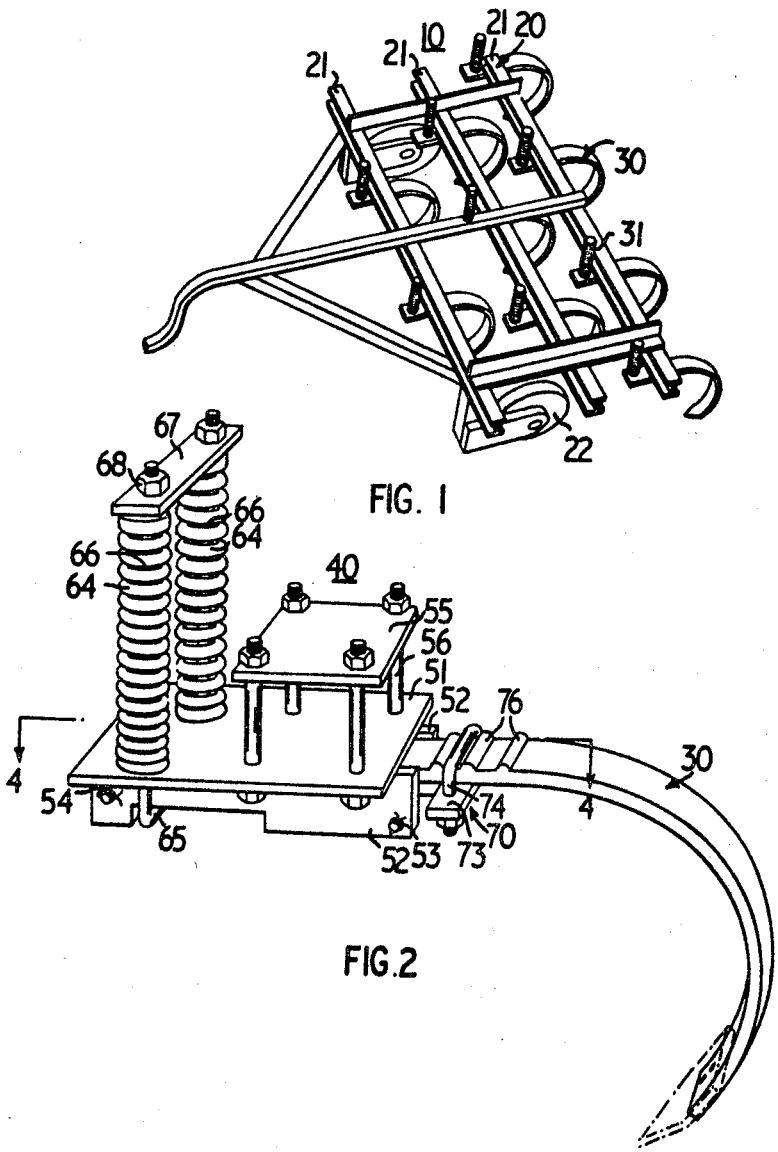
FIG. 1 is an oblique, general schematic view of a chisel plow.
FIG. 2 is a mounting assembly constructed in accordance with the present invention for securing the shanks to the frame of the chisel plow with the shank disposed in an operative position.

Referring now in detail to the drawings, shown in FIG. 1 is a chisel plow 10 consisting of a frame 20 having a plurality of shanks 30 secured thereto. The frame includes a plurality of generally parallel, transversely disposed I-beams 21 suitably interconnected to provide a rigid frame, the latter of which is supported upon a pair of wheels 22. Each shank is resiliently biased to an operative as shown by a compression spring 31. The spring may be secured to the shank adjacent the latter's upper forward end by a bolt with the whole assembly being secured to the frame by such bolt passing through an apertured plate rigidly mounted on the frame. In such construction, the plate would be interposed between the lower end of the spring and the upper surface of the shank. Not any of this detail is shown in the drawings, as it is conventional mounting for the shanks in a chisel plow.

In accordance with the present invention, each of the shanks 30 is secured to a transversely disposed beam 21 of the frame by a mounting assembly 40. This mounting assembly (see FIG. 2) consists of a base plate unit 50, a spring and bar unit 60 and a shank anchoring assembly 70. The base plate 50 includes a rigid plate member 51 having a spaced pair of flanges 52 projecting downwardly therefrom. These flanges are located at a distance from one another substantially equal to the width of the shank 30. Flanges 52 have aligned apertures 53 at the rearward end and aligned apertures 54 at the forward end. There is one each of apertures 53 and 54 in each flange 52 and the purpose of these will become apparent hereinafter. The rigid plate member 51 includes means for securing the same to an I-beam of the frame 20 and includes a further plate 55 secured to the rigid member by four bolts 56.

Figure 3:
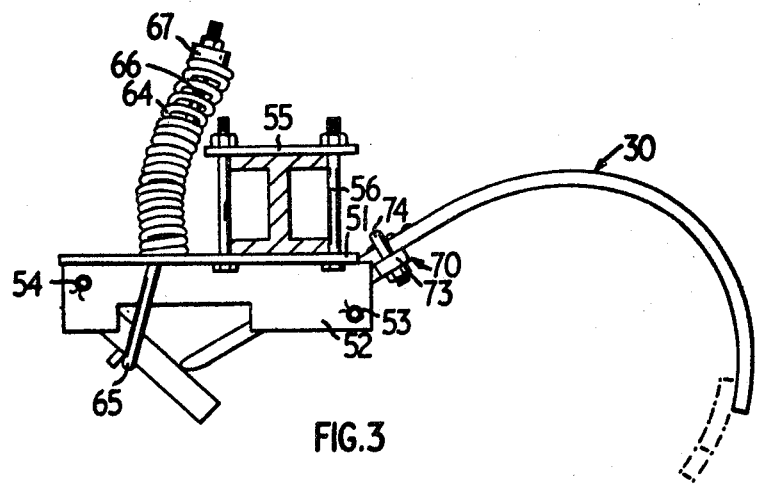
FIG. 3 is a vertical elevational view of the mounting assembly shown in FIG. 2 but with the shank in an inoperative position, resulting from striking a generally immovable object at the free end.

It will be noted from FIG. 3, the I-beam 21 of the frame is received between the plate 51 and the plate 55. The bolts and cooperating plates thus detachably but rigidly secure the mounting assembly to such I-beam. This type of mounting permits sliding the entire assembly along the length of the beam so as to vary the distance between adjacent shanks should such be desired.

Figure 4:
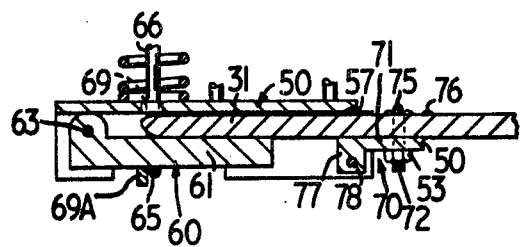
FIG. 4 is a cross-sectional view, substantially along section 4—4 of FIG. 2.

The spring and bar units 60 includes a bar member 61 having an enlarged portion 62 at one end, apertured transversely so as to receive a pin 63. The pin passes through the apertures 54 in the flanges 52 previously described. In this manner, the bar is pivoted so that it has a free end portion movable downwardly from the position shown in FIG. 2 into the position illustrated in FIG. 3. The bar 61 is retained in its uppermost position (FIGS. 2 and 4) by a U-clamp and a pair of springs 64. The U-clamp includes a bite portion 65 interconnecting a pair of spaced, generally parallel legs 66 which pass through respective ones of the pair of springs. These legs are interconnected at the opposite end by a bar member 67 retained in position by nuts 68 threaded onto the legs. Each of the legs passes through respective ones of a pair of apertures 69 in the plate 51 located at positions adjacent but outwardly from the downwardly projecting flanges 52. The compression coil springs 64 are interposed between the plate 67 and the plate 51 and thereby resiliently biases the bar member 61 to its normal uppermost operative position illustrated in FIG. 4. The bite portion 65 of the U-clamp is retained in position by a lug 69A welded to the lower surface of the bar. The operative or released position illustrated in FIG. 3 indicates the necessity of such a lug to retain and prevent the U-clamp from sliding along the bar.

The shank anchoring assembly 70 at the other end of the base plate, consists of a bar 71 and a U-shaped clamp 72. The bar is generally T-shaped in plan view having a pair of lugs 73 projecting outwardly which are apertured to receive respective ones of legs 74 of the U-shaped clamp 72 which are connected by a bite portion 75. This clamp passes over and secures the shank 30 to the bar 71. The upper surface of the shank 30 includes a plurality of generally parallel spaced lugs 76 which may be formed by welding material to the shank or having the shank originally formed in this configuration. The bite portion of the clamp is disposed rearwardly of one of these lugs and thereby prevents the shank from being removed from the shank anchoring assembly. The opposite end of the bar 71 includes an enlarged portion 77 apertured transversely to receive a pin 78 which passes through the aligned apertures 54 in the flanges 52. This pin pivotally mounts the shank anchoring assembly to the base plate unit 50.

It can be seen that the shank 30 is rigidly secured to the mounting assembly so as not to be removable but is pivotally mounted such that the free end may move when struck by a generally immovable object. The pivotal movement is against the spring pressure caused by the springs 64 of the spring and bar unit. To effect this the end of the shank anchored to the bar 71 projects forwardly therefrom to have a portion 31 bearing against the upper surface of the bar 61 of the spring and bar unit 60. Variously positioning the shank with respect to the clamp 72 of the anchoring assembly changes the characteristics in the force required for pivoting the shank about the pin 78. This can also be varied by adjusting the compression of the springs in the spring and bar unit.

The leading edge of the shank 30, during pivotal movement, slides along the bar 61 and thus it will be apparent that as pivoting of the shank progresses, the lesser is the force required to effect the pivotal movement. This decrease of force with increased pivotal movement is provided by the relative sliding movement between the leading end of the shank and the bar 61 of the spring and bar unit. As can be readily seen from FIG. 3, the effective lever arm for compressing the springs by the leading end of the shank is substantially greater in that illustrated position than the lever arm when the shank in an operative position as illusrated in FIG. 4.

The length of the bar 61 should be of such a length that the shank end in contact therewith does not override or pass beyond the end of the bar 61 when the shank is pivoted to its extreme uppermost position. In this way, the shank will return to an operative cultivating position immediately upon passing over or beyond the object which caused it to deflect in the first instance.

The amount of pivotal movement of the shank 30 about the pin 78 can be limited by the rigid plate 51. This is effected by appropriately positioning the pivot pin 78 with respect to the rear edge of the plate 51 the latter of which will be struck by the upper surface of the shank when pivoted upwardly. Alternatively, the plate may be notched (not shown) forwardly so as to permit further upward movement or it may be chamfered as at 57 illustrated in FIG. 4.

From the foregoing it will be seen there is provided a mounting assembly for a chisel plow whereby the shank may be readily secured to the implement and provide relatively large pivotal movement for the shank upon being struck by an object. The mounting assembly further provides for changing or maintains constant the force required to effect pivotal movement with an increase in the pivotal movement of the shank. This can be effected by correlation with the increasing force rate of the spring during compression, the previously described changing lever arm. The mounting assembly also provides various means whereby the force initially required is adjustable to provide for varying conditions under which the implement may be used.

It is obvious that in an alternative embodiment, adjustable stops may be provided as, for example, screws in the plate 51 struck by the upper edge of the shank upon pivotal movement so as to selectively adjust and limit the uppermost position to that which may be desired.

As a further alternative, to the present structure, the shank anchoring assembly 70 may be disposed of in place of having a lug rigidly secured to the shank and apertured to receive the pin 78. This may consist of a block welded or otherwise secured to the shank and projecting downwardly therefrom, and further this block may include a plurality of apertures spaced along the length of the leading edge of the shank and thereby permit variously positioning the leading end of the shank with respect to the bar 61 of the spring and bar unit 60.

The mounting assembly described involves resiliently urging a member to a normal operative position and this type of assembly involving the same principle may be used for other purposes, for example, a vehicle suspension system. The principle involved consists of a pair of pivotally mounted levers having overlapping portions, a spring associated with one member whereby a load applied to the other member is transferred to such spring. The lever arm for transferring the load is effectively variable in length in response to a change in length of the spring. By appropriately positioning the pivot points of the respective members, reaction of the spring with respect to the load may provide a flat characteristic, an increasing characteristic or a decreasing characteristic. By this is meant that the load applied may be either directly or inversely proportional to or equal to the resisting force of the spring throughout the range of length of the spring.

In the instant application, a decrease in the load force required to compress the spring with increased pivotal movement of the shank vertically upwards to avoid an object is an important consideration. This is so because of the fact that as the chisel leaves the ground, the forces applied to the shank are generally perpendicular to the shank rather than longitudinally along the length of the member when the same is in the ground. This of course, is quite obvious because of the arcuate shape of the shank.

I claim:

1. A mounting assembly for securing a shank of an earth working tool to the frame of an implement comprising a generally rigid first member securable to the frame of said implement; a rigid bar member pivotally secured to said first member at a first pivot axis and having a portion extending outwardly therefrom, means resiliently biasing said bar member to a first operative position, and means for mounting said shank to said first rigid member to pivot about a second axis disposed at a position remote from said first axis, and extension means rigid with respect to said shank projecting from said second axis of pivot toward said first axis and engaging said extending portion of the bar member at a position to act against the resilient bias and thereby resiliently bias the shank to a normally operative position, wherein said shank is adjustable with respect to the second axis and thereby provides means for selectively varying the location at which said extension means engages said bar member.

2. A mounting assembly as defined in claim 1 wherein the shank extension means is in sliding contact with the bar member extending portion and the pivot axes are so located that such sliding contact effectively causes an increase in the lever arm length acting against the spring bias while the shank pivots from its normal operative position against the spring bias.

3. A mounting assembly for securing a shank of an earth working tool to the frame of an implement comprising a base plate detachably securable to the frame of said implement, a bar member having a contacting surface and being pivotally secured to said base plate at a first pivot axis, means resiliently biasing said bar to a first operative position, bracket means pivotally supported on said base plate at a second pivot axis spaced from said first pivot axis and means for adjustably securing said shank to said bracket means intermediate the ends of said shank whereby said shank is adjustable with respect to the second axis and one end of said shank extends toward said first pivot axis and slidingly engages said contacting surface of said bar member when said shank is pivoted on said base plate, said adjusting means thereby providing means for selectively varying the location at which said one end of the shank engages said contacting surface.

4. A mounting assembly for releasably securing a shank of an earth working tool to a frame of an implement comprising a base plate detachably securable to said frame, a bar member pivotally secured to said plate at a first pivot axis, means resiliently biasing said bar member to a first position, said bar member having a flat bearing surface adjacent and in spaced relation with said base plate, mounting means pivotally secured to said base plate at a second pivot axis spaced from and parallel to said first pivot axis, and securing means connecting an intermediate portion of said shank to said mounting means whereby one end of said shank is in sliding contact with said bearing surface when said shank is pivoted on said base plate, said shank being adjustable with respect to said mounting means to change the effective length between said second pivot axis and said one end of said shank.

References Cited
UNITED STATES PATENTS 2,100,499  11/1937  Whitehead _____ 172—643

FOREIGN PATENTS 703,806  2/1965  Canada.

ABRAHAM G. STONE, *Primary Examiner.*

STEPHEN C. PELLEGRINO, *Assistant Examiner.*

U.S. Cl. X.R.

172—265